(12) United States Patent
Fujisawa et al.

(10) Patent No.: US 8,309,480 B2
(45) Date of Patent: Nov. 13, 2012

(54) CRYSTALLIZABLE GLASS AND CRYSTALLIZED GLASS OBTAINED BY CRYSTALLIZING THE SAME

(75) Inventors: Tai Fujisawa, Otsu (JP); Shingo Nakane, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 70 days.

(21) Appl. No.: 12/993,126

(22) PCT Filed: Apr. 17, 2009

(86) PCT No.: PCT/JP2009/001773
§ 371 (c)(1),
(2), (4) Date: Nov. 17, 2010

(87) PCT Pub. No.: WO2009/141959
PCT Pub. Date: Nov. 26, 2009

(65) Prior Publication Data
US 2011/0071011 A1 Mar. 24, 2011

(30) Foreign Application Priority Data

May 19, 2008 (JP) .................................. 2008-131025
Mar. 18, 2009 (JP) .................................. 2009-065791

(51) Int. Cl.
*C03C 10/14* (2006.01)
*C03C 10/12* (2006.01)
(52) U.S. Cl. ................................................ 501/4; 501/7
(58) Field of Classification Search .................... 501/4, 7
See application file for complete search history.

(56) References Cited

U.S. PATENT DOCUMENTS

| 6,472,338 B1 | 10/2002 | Shimatani et al. | |
| 6,846,760 B2 * | 1/2005 | Siebers et al. | 501/32 |
| 7,981,823 B2 * | 7/2011 | Siebers et al. | 501/7 |
| 8,053,381 B2 * | 11/2011 | Siebers et al. | 501/4 |
| 2002/0011481 A1 | 1/2002 | Melson et al. | |
| 2002/0023463 A1 | 2/2002 | Siebers et al. | |
| 2003/0218001 A1 | 11/2003 | Siebers et al. | |
| 2005/0143247 A1 | 6/2005 | Siebers et al. | |
| 2007/0149379 A1 * | 6/2007 | Hsu et al. | 501/7 |
| 2007/0259767 A1 | 11/2007 | Siebers et al. | |

FOREIGN PATENT DOCUMENTS

| EP | 1 465 460 A | | 10/2004 |
| JP | 03023237 | * | 1/1991 |
| JP | 06329439 | * | 11/1994 |
| JP | 11100230 | * | 4/1999 |
| JP | 11-228180 A | | 8/1999 |
| JP | 11-228181 A | | 8/1999 |
| JP | 2001-048582 A | | 2/2001 |
| JP | 2001-354429 A | | 12/2001 |
| JP | 2001-354446 A | | 12/2001 |
| JP | 2001348250 | * | 12/2001 |
| JP | 2004-523446 A | | 8/2004 |
| JP | 2004-251615 A | | 9/2004 |
| JP | 2005-053711 A | | 3/2005 |
| JP | 2007-254277 A | | 10/2007 |

OTHER PUBLICATIONS

Official Communication issued in International Patent Application No. PCT/JP2009/001773, mailed on Jun. 16, 2009.

* cited by examiner

*Primary Examiner* — Karl Group
(74) *Attorney, Agent, or Firm* — Keating & Bennett, LLP

(57) ABSTRACT

To provide crystallizable glass that is less likely to be devitrified even when formed into shape by a float process, causes no breakage during a forming step and a crystallization step and is capable of precipitating LAS-based crystals as main crystals by subjecting the glass to heat treatment after being formed into shape, and crystallized glass obtained by crystallizing the crystallizable glass. The crystallizable glass of the present invention is characterized by substantially containing neither $As_2O_3$ nor $Sb_2O_3$ and having a composition of, in percent by mass, 55.0 to 73.0% $SiO_2$, 17.0 to 27.0% $Al_2O_3$, 2.0 to 5.0% $Li_2O$, 0 to 1.5% MgO, 0 to 1.5% ZnO, 0 to 1.0% $Na_2O$, 0 to 1.0% $K_2O$, 0 to 3.8% $TiO_2$, 0 to 2.5% $ZrO_2$, 0 to 0.6% $SnO_2$, and 2.3 to 3.8% $TiO_2+ZrO_2$.

5 Claims, 1 Drawing Sheet

[FIG. 1]
(a)
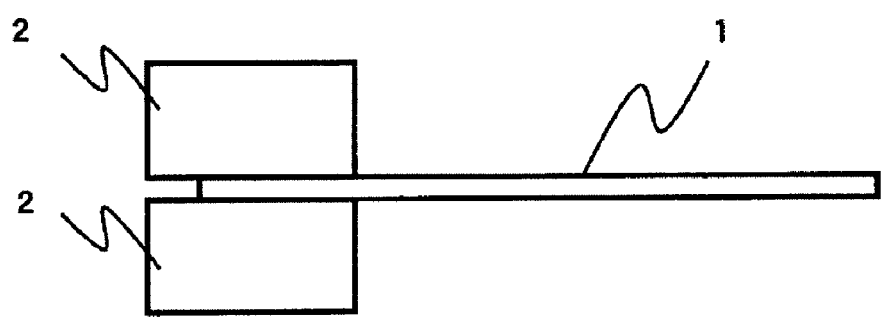
(b)
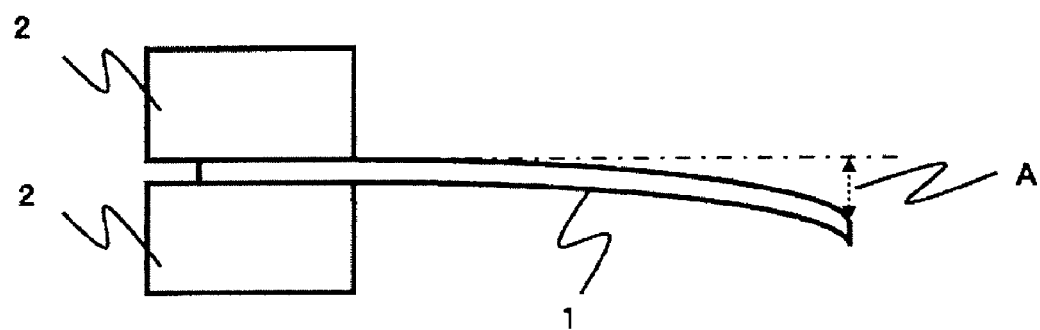

CRYSTALLIZABLE GLASS AND CRYSTALLIZED GLASS OBTAINED BY CRYSTALLIZING THE SAME

TECHNICAL FIELD

This invention relates to crystallizable glass and crystallized glass obtained by crystallizing the same.

BACKGROUND ART

As disclosed in Patent Literatures 1 and 2, $Li_2O$—$Al_2O_3$—$SiO_2$ based crystallized glass obtained by precipitating LAS-based crystals (β-quartz solid solution or β-spodumene solid solution) as main crystals is conventionally used as a material for front windows of oil stoves, wood stoves and the like, substrates for high-technology products, such as color filter substrates, image sensor substrates and the like, setters for firing electronic components, microwave oven shelfs, electromagnetic induction heating cooker top plates and fire proof windows.

$Li_2O$—$Al_2O_3$—$SiO_2$-based crystallized glass has low coefficient of thermal expansion and high mechanical strength, and therefore has excellent thermal properties. Furthermore, the glass can change the crystal species to be precipitated by changing the heat treatment conditions in the crystallization step. Therefore, both of transparent crystallized glass (containing β-quartz solid solution precipitated therein) and white opaque crystallized glass (containing β-spodumene solid solution precipitated therein) can be produced from a mother glass of the same composition and selectively applied to as usage.

Such crystallized glass can be generally produced by forming $Li_2O$—$Al_2O_3$—$SiO_2$-based crystallizable glass containing a nucleation agent, such as $TiO_2$ or $ZrO_2$, into a desired shape by a pressing process or a roll-out process, then subjecting the formed product to heat treatment at temperatures of about 600° C. to 800° C. to form crystal nuclei and then further subjecting the product to heat treatment at temperatures of about 800° C. to 1100° C. to precipitate LAS-based crystals therein.

Particularly, crystallized glass in sheet form can be produced by forming molten glass into a sheet by a roll-out process in which molten glass is guided and sandwiched between a pair of forming rolls and rolled while being quenched by the rolls, and then subjecting the formed product to heat treatment to crystallize it.

However, if crystallized glass in sheet form is produced using a roll-out process, the width of the forming rolls must be large and the deformation of the forming rolls at high temperatures is therefore significant. This presents a problem in that it is difficult to stably form sheet glass large in the width direction of the forming rolls. In addition, since the molten glass must be quenched by the forming rolls, a problem also arises in that the production speed cannot be increased.

To solve these problems, a float process is proposed in Patent Literatures 3 and 4, i.e., a process for obtaining crystallized glass in sheet form by floating molten glass on a bath of molten metal tin (float bath) to form the molten glass into a sheet and then subjecting the sheet glass to heat treatment to crystallize it.

CITATION LIST

Patent Literature

Patent Literature 1: Published Japanese Patent Application No. H11-228180

Patent Literature 2: Published Japanese Patent Application No. H11-228181

Patent Literature 3: Published Japanese Patent Application No. 2001-354429

Patent Literature 4: Published Japanese Patent Application No. 2001-354446

SUMMARY OF INVENTION

Technical Problem

However, in the float process, molten glass is formed into a sheet on a high-temperature float bath in a period of time of about 10 to 30 minutes. This means that the molten glass is much more slowly cooled in contrast to the roll-out process in which molten glass is formed into a sheet by cooling it in several seconds to several ten seconds. Therefore, although not a matter of concern when molten glass is formed into a sheet by the roll-out process, devitrification is likely to occur in glass formed by a float process, even if the glass has been taken into consideration to be formed from molten glass by such a float process as disclosed in Patent Literature 4. As a result, crystallizable glass obtained through a forming step and an annealing step may cause a problem of breakage due to a difference in coefficient of thermal expansion between a devitrified phase and a glass phase. In addition, even if crystallizable glass could be obtained without breakage up to that time, it may cause breakage in a heat treatment step for crystallizing the glass (crystallization step).

An object of the present invention is to provide crystallizable glass that is less likely to be devitrified even when formed into shape by a float process, causes no breakage from a forming step to a crystallization step and is capable of precipitating LAS-based crystals as main crystals by subjecting the glass to heat treatment after being formed into shape, and crystallized glass obtained by crystallizing the crystallizable glass.

Solution to Problem

As a result of various experiments, the inventors have found that if $Li_2O$—$Al_2O_3$—$SiO_2$-based crystallizable glass containing a nucleation agent, such as $TiO_2$ or $ZrO_2$, is formed into shape while being slowly cooled as in a float process, a main devitrified product precipitated in the forming step is β-spodumene solid solution, and that by controlling the content of $TiO_2$ or $ZrO_2$, the precipitation of devitrified products, such as β-spodumene solid solution, in the forming step can be effectively reduced and simultaneously crystal nuclei can be sufficiently formed in a crystallization step, and have proposed the present invention.

Specifically, crystallizable glass of the present invention is characterized by substantially containing neither $As_2O_3$ nor $Sb_2O_3$ and having a composition of, in percent by mass, 55.0 to 73.0% $SiO_2$, 17.0 to 27.0% $Al_2O_3$, 2.0 to 5.0% $Li_2O$, 0 to 1.5% MgO, 0 to 1.5% ZnO, 0 to 1.0% $Na_2O$, 0 to 1.0% $K_2O$, 0 to 3.8% $TiO_2$, 0 to 2.5% $ZrO_2$, 0 to 0.6% $SnO_2$, and 2.3 to 3.8% $TiO_2$+$ZrO_2$.

Furthermore, crystallized glass of the present invention is characterized by being obtained by subjecting the crystallizable glass to heat treatment to crystallize the crystallizable glass.

Advantageous Effects of Invention

The crystallizable glass of the present invention is less likely to be devitrified even when formed into shape while being slowly cooled, and can be therefore prevented from breakage in a forming step and a crystallization step. In addition, by subjecting the glass to heat treatment after being formed into shape, LAS-based crystals can be precipitated as main crystals. Therefore, the glass is effective as crystallizable glass for forming it into a large-sized sheet of glass by a float process.

Furthermore, the crystallized glass of the present invention obtained by crystallizing the crystallizable glass of the present invention has low coefficient of thermal expansion, high mechanical strength and excellent thermal shock resistance, and is therefore suitable as a material for front windows of oil stoves, wood stoves and the like, substrates for high-technology products, such as color filter substrates, image sensor substrates and the like, setters for firing electronic components, microwave oven shelfs, electromagnetic cooker top plates and fire proof windows.

In addition, the glass can be formed into a large-sized sheet, which is advantageous to improvement in productivity.

BRIEF DESCRIPTION OF DRAWINGS

FIG. 1 is views illustrating a method for evaluating the amount of thermal deformation.

DESCRIPTION OF EMBODIMENTS

Crystallizable glass of the present invention is essentially composed of $Li_2O$—$Al_2O_3$—$SiO_2$-based glass containing a nucleation agent, such as $TiO_2$ or $ZrO_2$, which has the property of precipitating LAS-based crystals when subjected to heat treatment. If glass of this system is formed into shape while being slowly cooled as in a float process, it may be likely to be devitrified and likely to be broken owing to a difference in coefficient of thermal expansion between a devitrified phase and a glass phase.

However, in the present invention, the combined content of $TiO_2$ and $ZrO_2$ serving as nucleation agent is limited to 2.3 to 3.8%. Therefore, the glass is less likely to be devitrified even when formed into shape while being slowly cooled, can be formed by a float process and can be prevented from breakage due to denitrification. In addition, by subjecting the glass to heat treatment after being formed into shape, LAS-based crystals can be precipitated as main crystals. Therefore, crystallized glass having low coefficient of thermal expansion, high mechanical strength and excellent thermal shock resistance can be obtained, and crystal nuclei can be sufficiently formed, thereby preventing the crystallized glass from clouding and breakage due to precipitation of large-size crystals.

Hereinafter, a description will be given of the reasons why the glass composition is limited as described previously in the present invention.

$SiO_2$ is a component that forms part of a glass network former and also constitutes part of a LAS-based crystal, and the content thereof is 55.0 to 73.0%. If the content of $SiO_2$ is low, the coefficient of thermal expansion is likely to be high, which makes it difficult to obtain crystallized glass having excellent thermal shock resistance. In addition, the chemical durability tends to be deteriorated. On the other hand, if the above content is high, the meltability of the glass is likely to be deteriorated or the viscosity of glass melt tends to be increased, which makes it difficult to form the glass into shape. The preferred range of the $SiO_2$ content is 58.0 to 70.0%, and the more preferred range is 60.0 to 68.0%.

$Al_2O_3$ is a component that forms part of a glass former and also constitutes part of a LAS-based crystal, and the content thereof is 17.0 to 27.0%. If the content of $Al_2O_3$ is low, the coefficient of thermal expansion is likely to be high, which makes it difficult to obtain crystallized glass having excellent thermal shock resistance. In addition, the chemical durability tends to be deteriorated. On the other hand, if the above content is high, the meltability of the glass is likely to be deteriorated or the viscosity of glass melt tends to be increased, which makes it difficult to form the glass into shape. In addition, when the glass is formed into shape while being slowly cooled, mullite crystals tend to be precipitated to devitrify the glass and make the glass subject to breakage. This makes it difficult to form the glass into shape using a float process. The preferred range of the $Al_2O_3$ content is 19.0 to 25.0%, and the more preferred range is 20.0 to 23.0%.

$Li_2O$ is a constituent of a LAS-based crystal, and a component that largely influences the crystallinity and reduces the viscosity of glass to improve the meltability and formability of the glass. The content thereof is 2.0 to 5.0%. If the content of $Li_2O$ is low, when the glass is formed into shape while being slowly cooled, mullite crystals tend to be precipitated to devitrify the glass and make the glass subject to breakage. This makes it difficult to form the glass into shape using a float process. In addition, in crystallizing the glass, LAS-based crystals are less likely to be precipitated. Therefore, crystallized glass having excellent thermal shock resistance becomes difficult to obtain, and crystal nuclei become difficult to sufficiently form, whereby large-size crystals may be precipitated to make the glass cloudy and subject to breakage. Moreover, the meltability of the glass is likely to be deteriorated or the viscosity of glass melt tends to be increased, which makes it difficult to form the glass into shape. On the other hand, if the content of $Li_2O$ is high, the crystallinity becomes too high. Thus, when the glass is formed into shape while being slowly cooled, β-spodumene solid solution tends to be precipitated to devitrify the glass and make the glass subject to breakage. This makes it difficult to form the glass into shape using a float process. The preferred range of the $Li_2O$ content is 2.3 to 4.7%, and the more preferred range is 2.5 to 4.5%.

MgO is a component that can be dissolved in LAS-based crystals as a solid solution, and the content thereof is 0 to 1.5%. If the content of MgO is high, the crystallinity becomes too high. Thus, when the glass is formed into shape while being slowly cooled, the glass tends to be devitrified and becomes subject to breakage. This makes it difficult to form the glass into shape using a float process. The preferred range of the MgO content is 0 to 1.4%, and the more preferred range is 0 to 1.2%.

ZnO is, like MgO, a component that can be dissolved in LAS-based crystals as a solid solution, and the content thereof is 0 to 1.5%. If the content of ZnO is high, the crystallinity becomes too high. Thus, when the glass is formed into shape while being slowly cooled, the glass tends to be devitrified and becomes subject to breakage. This makes it difficult to form the glass into shape using a float process. The preferred range of the ZnO content is 0 to 1.4%, and the more preferred range is 0 to 1.2%.

The crystallizable glass preferably contains a combined content of 2.0 to 5.2% of $Li_2O$, MgO and ZnO in order to make the glass less likely to be devitrified even when formed into shape while being slowly cooled, enable the formation thereof using a float process, sufficiently form crystal nuclei in a crystallization step after being formed into shape and precipitate LAS-based crystals as main crystals. If the combined content of $Li_2O$, MgO and ZnO is too low, when the glass is formed into shape while being slowly cooled, mullite crystals tend to be precipitated to devitrify the glass and make the glass subject to breakage. This makes it difficult to form the glass into shape using a float process. In addition, in crystallizing the glass, LAS-based crystals are less likely to be precipitated. Therefore, crystallized glass having excellent thermal shock resistance becomes difficult to obtain, and crystal nuclei become difficult to sufficiently form, whereby large-size crystals may be precipitated to make the glass cloudy and subject to breakage. On the other hand, if the combined content of $Li_2O$, MgO and ZnO is high, the crystallinity becomes too high. Thus, when the glass is formed into shape while being slowly cooled, β-spodumene solid solution tends to be precipitated to devitrify the glass and make the glass subject to breakage. This makes it difficult to form the glass into shape using a float process. The preferred range of the combined content of $Li_2O$, MgO and ZnO is 2.3 to 5.0%.

$Na_2O$ is a component for reducing the viscosity of glass to improve the meltability and formability of the glass, and the content thereof is 0 to 1.0%. If the content of $Na_2O$ is too high, when the glass is formed into shape while being slowly cooled, $Na_2O$, which is normally not a constituent of a crystal, is incorporated into β-spodumene solid solution to promote crystal growth, whereby the glass tends to be devitrified and becomes subject to breakage. This makes it difficult to form the glass into shape using a float process. In addition, the coefficient of thermal expansion is likely to be high, which makes it difficult to obtain crystallized glass having excellent thermal shock resistance. The preferred range of the $Na_2O$ content is 0 to 0.6%, and the more preferred range is 0.05 to 0.5%.

$K_2O$ is a component for reducing the viscosity of glass to improve the meltability and formability of the glass, and the content thereof is 0 to 1.0%. If the content of $K_2O$ is too high, the coefficient of thermal expansion is likely to be high, which makes it difficult to obtain crystallized glass having excellent thermal shock resistance. In addition, the creep resistance tends to be deteriorated. Thus, if the crystallized glass is used at high temperatures for a long time, it becomes easily deformable. The preferred range of the $K_2O$ content is 0 to 0.6%, and the more preferred range is 0.05 to 0.5%.

If white opaque crystallized glass is desired in which β-spodumene solid solution is precipitated, particularly, a combined use of $Na_2O$ and $K_2O$ is preferred. The reason for this is as follows: $Na_2O$ is a component that can be incorporated into β-spodumene solid solution. If the glass is attempted to be reduced in viscosity and improved in meltability and formability by containing not both of $Na_2O$ and $K_2O$ but only $Na_2O$ in the glass, the glass will have to contain a high content of $Na_2O$. When in such a condition molten glass is formed into shape, the glass will be likely to be devitrified. In order to reduce the glass viscosity without incurring devitrification during the formation into the shape, $K_2O$ is preferably used in combination with $Na_2O$ because $K_2O$ is a component for reducing the glass viscosity and thereby improving the glass meltability and formability without being incorporated into β-spodumene solid solution.

If $Na_2O$ and $K_2O$ are used together, each of the contents of these components is preferably 0.05 to 1.0%. If, at an excessively low content of $Na_2O$, the viscosity of glass is attempted to be reduced to easily obtain the effect of improving the glass meltability and formability, the glass must contain a high content of $K_2O$. In this case, as a result, the coefficient of thermal expansion becomes high, thereby making it difficult to obtain crystallized glass having excellent thermal shock resistance, and the creep resistance is deteriorated, whereby the crystallized glass becomes easily deformable when used at high temperatures for a long time. On the other hand, if, at an excessively low content of $K_2O$, the viscosity of glass is attempted to be reduced to easily obtain the effect of improving the glass meltability and formability, the glass must contain a high content of $Na_2O$. In this case, as a result, when molten glass is formed into shape, the glass is likely to be devitrified.

The combined content of $Na_2O$ and $K_2O$ is preferably 0.35 to 1.0%. If the combined content of $Na_2O$ and $K_2O$ is too low, this makes it difficult to obtain the effect of reducing the glass viscosity and thereby improving the glass meltability and formability. On the other hand, if the combined content of $Na_2O$ and $K_2O$ is high, the coefficient of thermal expansion is likely to be high, which makes it difficult to obtain crystallized glass having excellent thermal shock resistance. In addition, when molten glass is formed into shape, the glass is likely to be devitrified. Furthermore, the creep resistance is deteriorated, whereby the crystallized glass becomes easily deformable when used at high temperatures for a long time. The preferred range of the combined content of $Na_2O$ and $K_2O$ is 0.35 to 0.9%.

$TiO_2$ is a nucleation agent for precipitating crystals in a crystallization step, and the content thereof is 0 to 3.8%. If the content of $TiO_2$ is too high, when the glass is formed into shape while being slowly cooled, the glass tends to be devitrified and becomes subject to breakage. This makes it difficult to form the glass into shape using a float process. The preferred range of the $TiO_2$ content is 0.1 to 3.8%, and the more preferred range is 0.5 to 3.6%.

$ZrO_2$ is, like $TiO_2$, a nucleation agent for precipitating crystals in a crystallization step, and the content thereof is 0 to 2.5%. If the content of $ZrO_2$ is too high, the glass tends to be devitrified when melted, which makes it difficult to form the glass into shape. The preferred range of the $ZrO_2$ content is 0.1 to 2.5%, and the more preferred range is 0.5 to 2.3%.

Note that it is important that the crystallizable glass contain a combined content of 2.3 to 3.8% of $TiO_2$ and $ZrO_2$ in order to make the glass less likely to be devitrified even when formed into shape while being slowly cooled, sufficiently form crystal nuclei in a crystallization step after being formed into shape and precipitate LAS-based crystals as main crystals. If the combined content of $TiO_2$ and $ZrO_2$ is low, in crystallizing the glass, LAS-based crystals are less likely to be precipitated, which makes it difficult to obtain crystallized glass having excellent thermal shock resistance. In addition, crystal nuclei are less likely to be sufficiently formed, whereby large-size crystals may be precipitated to make the glass opaque and subject to breakage. On the other hand, if the combined content of $TiO_2$ and $ZrO_2$ is too high, when the glass is formed into shape while being slowly cooled, the glass tends to be devitrified and becomes subject to breakage. This makes it difficult to form the glass into shape using a float process. The preferred range of the combined content of $TiO_2$ and $ZrO_2$ is 2.5 to 3.6%, and the more preferred range is 2.7 to 3.4%.

$SnO_2$ is a fining agent component, and the content thereof is 0 to 0.6%. If the content of $SnO_2$ is high, the glass tends to be devitrified when melted, which makes it difficult to form the glass into shape. The preferred range of the $SnO_2$ content is 0 to 0.45%, and the more preferred range is 0.01 to 0.4%.

Furthermore, the crystallizable glass of the present invention can be added to, aside from the above components, various other components so long as they do not impair desired properties.

For example, the glass can be added to $B_2O_3$ in order to inhibit the growth of large-size crystals in crystallizing the glass. If the glass is excessively added to $B_2O_3$, the thermal resistance tends to be impaired. Therefore, the content of $B_2O_3$ is preferably 2.0% or less.

Furthermore, the glass can be added to $P_2O_5$, which is a component having a low tendency to be devitrified in a forming step and having the effect of promoting nucleation in a crystallization step, up to 3.0%, preferably up to 2.0%. If the glass is added to $P_2O_5$, the combined content of $P_2O_5$, $TiO_2$ and $ZrO_2$ is preferably 5.0% or less. The reason for this is that if the combined content of $P_2O_5$, $TiO_2$ and $ZrO_2$ is too high, when the glass is formed into shape while being slowly cooled, the glass tends to be devitrified and becomes subject to breakage, which makes it difficult to form the glass into shape using a float process.

In order to reduce the glass viscosity and thereby improve the glass meltability and formability, the glass can be added to CaO, SrO and/or BaO up to a combined content of 5.0%. Note that CaO, SrO and BaO are components that tend to devitrify the glass when melting it and the combined content of them is therefore preferably 2.0% or less.

Furthermore, the glass can be added to colorant(s), such as NiO, CoO, $Cr_2O_3$, $Fe_2O_3$, $V_2O_5$, $Nb_2O_3$ or $Gd_2O_3$, up to a combined content of 2.0%.

Moreover, the glass can be added to fining agent(s), such as Cl or $SO_3$, each up to 2.0%.

Although $As_2O_3$ and $Sb_2O_3$ are also fining agent components, these components can be reduced in a float bath to form metallic foreign substances when the glass is formed into shape by a float process. Therefore, it is important that the glass should substantially contain neither of these components. Note that "substantially contain neither of these components" herein means the level at which these components are not positively used as raw materials but may be mixed as impurities into the glass, and more specifically means that the content of them is 0.1% or less.

The crystallizable glass having the composition range as described above is less likely to be devitrified even when formed into shape while being slowly cooled, and can be therefore formed into shape by a float process.

It goes without saying that the crystallizable glass of the present invention can be formed into shape also by a pressing process or a roll-out process which are forming processes less likely to cause devitrification than the float process.

Next will be described crystallized glass of the present invention.

The crystallized glass of the present invention can be produced in the following manner.

First, raw materials of glass are compounded so that glass substantially contains neither $As_2O_2$ nor $Sb_2O_2$ and has a composition of, in percent by mass, 55.0 to 73.0% $SiO_2$, 17.0 to 27.0% $Al_2O_3$, 2.0 to 5.0% $Li_2O$, 0 to 1.5% MgO, 0 to 1.5% ZnO, 0 to 1.0% $Na_2O$, 0 to 1.0% $K_2O$, 0 to 3.8% $TiO_2$, 0 to 2.5% $ZrO_2$, 0 to 0.6% $SnO_2$, and 2.3 to 3.8% $TiO_2+ZrO_2$. If needed, the glass may be added to components for improving the glass meltability and formability, colorants and/or fining agents.

Next, the compounded raw materials of glass is melted at temperatures of 1550° C. to 1750° C. and then formed into shape, thereby obtaining crystallizable glass. The forming process includes various processes, such as a float process, a pressing process or a roll-out process. However, since the crystallizable glass having the above composition range is less likely to be devitrified even when formed into shape while being slowly cooled, if a large-sized sheet of glass is desired, the crystallizable glass is preferably formed into shape by the float process that can form glass into a sheet at relatively low cost.

Subsequently, the crystallizable glass formed into shape is subjected to heat treatment at 600° C. to 800° C. for 1 to 5 hours to form crystal nuclei, and then further subjected to heat treatment at 800° C. to 1100° C. for 0.5 to 3 hours to precipitate LAS-based crystals as main crystals therein, thereby obtaining crystallized glass of the present invention. If transparent crystallized glass is desired, it can be obtained by subjecting the crystallizable glass after the formation of crystal nuclei to heat treatment at 800° C. to 950° C. for 0.5 to 3 hours to precipitate β-quartz solid solution. If white opaque crystallized glass is desired, it can be obtained by subjecting the crystallizable glass after the formation of crystal nuclei to heat treatment at 1000° C. to 1100° C. for 0.5 to 3 hours to precipitate β-spodumene solid solution.

Since the crystallized glass of the present invention is obtained by precipitating LAS-based crystals as main crystals as described above, it can have a low coefficient of thermal expansion of about $-10\times10^{-7}$ to $30\times10^{-7}/°$ C. (within the range of 30 to 750° C.) and high mechanical strength.

Furthermore, the obtained crystallized glass may be subjected to post processing, such as cutting, polishing and/or bending, or may be subjected to glazed decoration or the like on the surface.

EXAMPLES

Hereinafter, the present invention will be described with reference to examples.

TABLES 1 to 4 show examples of the present invention (Samples Nos. 1 to 17) and comparative examples (Samples Nos. 18 to 22).

TABLE 1

|  | No. 1 | No. 2 | No. 3 | No. 4 | No. 5 | No. 6 |
|---|---|---|---|---|---|---|
| Glass Composition (% by mass) | | | | | | |
| $SiO_2$ | 65.6 | 66.1 | 68.0 | 66.1 | 67.0 | 65.6 |
| $Al_2O_3$ | 22.0 | 22.5 | 22.0 | 22.6 | 23.0 | 22.0 |
| $Li_2O$ | 4.4 | 3.9 | 4.0 | 3.6 | 4.0 | 4.4 |
| MgO | 1.0 | 1.0 | 1.0 | 0.8 | — | 0.7 |
| ZnO | — | — | 0.5 | 0.5 | 0.5 | — |
| $Na_2O$ | 0.4 | 0.4 | 0.5 | 0.2 | 0.5 | 0.4 |
| $K_2O$ | 0.4 | 0.4 | 0.5 | 0.5 | 0.5 | 0.4 |
| CaO | — | — | — | — | — | — |
| BaO | 1.5 | 1.2 | — | 1.2 | 1.0 | 1.5 |
| $TiO_2$ | 1.5 | 1.5 | 3.5 | 1.3 | 2.1 | 1.5 |
| $ZrO_2$ | 2.2 | 2.1 | — | 2.0 | 0.9 | 2.2 |
| $P_2O_5$ | 1.0 | 0.9 | — | 1.2 | 0.5 | 1.0 |
| $B_2O_3$ | — | — | — | — | 0.5 | — |
| $SnO_2$ | — | — | — | — | — | 0.3 |
| $TiO_2 + ZrO_2$ | 3.7 | 3.6 | 3.5 | 3.3 | 3.0 | 3.7 |
| $Li_2O + MgO + ZnO$ | 5.4 | 4.9 | 5.5 | 4.9 | 4.5 | 5.1 |
| Clarity | 3 | 3 | 3 | 3 | 3 | 5 |
| Degree of Devitrification due to Temperature Drop Schedule (1) | 3 | 4 | 3 | 5 | 5 | 4 |
| Main Crystal | β-Q | β-Q | β-Q | β-Q | β-Q | β-Q |
| Precipitation of Large-size Crystals | ○ | ○ | ○ | ○ | ○ | ○ |
| Cracks Schedule (2) | ○ | ○ | ○ | ○ | ○ | ○ |
| Main Crystal | β-S | β-S | β-S | β-S | β-S | β-S |
| Cracks | ○ | ○ | ○ | ○ | ○ | ○ |
| Amount of Thermal Deformation(mm) | 8 | 8 | 9 | 9 | 10 | 8 |

TABLE 2

| | No. 7 | No. 8 | No. 9 | No. 10 | No. 11 | No. 12 |
|---|---|---|---|---|---|---|
| Glass Composition (% by mass) | | | | | | |
| $SiO_2$ | 65.8 | 67.6 | 68.5 | 67.0 | 67.8 | 66.7 |
| $Al_2O_3$ | 22.0 | 22.0 | 20.0 | 21.2 | 23.0 | 22.5 |
| $Li_2O$ | 4.4 | 3.7 | 4.0 | 4.0 | 2.5 | 3.3 |
| MgO | 0.7 | 0.5 | 0.7 | 0.5 | 1.0 | 0.6 |
| ZnO | — | 0.5 | 0.7 | 0.7 | 1.3 | 0.8 |
| $Na_2O$ | 0.4 | 0.2 | 0.8 | 0.6 | 0.1 | 0.6 |
| $K_2O$ | 0.4 | 0.6 | — | 0.2 | 0.6 | 0.1 |
| CaO | — | — | — | — | — | — |
| BaO | 1.5 | — | — | 1.0 | — | — |
| $TiO_2$ | 1.5 | 1.7 | 1.9 | 1.8 | 1.4 | 1.6 |
| $ZrO_2$ | 2.2 | 1.8 | 1.9 | 1.9 | 2.3 | 2.0 |
| $P_2O_5$ | 1.0 | 1.0 | 1.0 | 0.5 | — | 0.7 |
| $B_2O_3$ | — | — | — | — | — | 1.0 |
| $SnO_2$ | 0.1 | 0.4 | 0.5 | 0.6 | — | 0.1 |
| $TiO_2 + ZrO_2$ | 3.7 | 3.5 | 3.8 | 3.7 | 3.7 | 3.6 |
| $Li_2O + MgO + ZnO$ | 5.1 | 4.7 | 5.4 | 5.2 | 4.8 | 4.7 |
| Clarity | 4 | 5 | 5 | 5 | 3 | 4 |
| Degree of Devitrification due to Temperature Drop Schedule (1) | 4 | 4 | 3 | 4 | 4 | 4 |
| Main Crystal | β-Q | β-Q | β-Q | β-Q | β-Q | β-Q |
| Precipitation of Large-size Crystals | ○ | ○ | ○ | ○ | ○ | ○ |
| Cracks Schedule (2) | ○ | ○ | ○ | ○ | ○ | ○ |
| Main Crystal | β-S | β-S | β-S | β-S | β-S | β-S |
| Cracks | ○ | ○ | ○ | ○ | ○ | ○ |
| Amount of Thermal Deformation (mm) | 8 | 9 | 4 | 5 | 8 | 5 |

TABLE 3

| | No. 13 | No. 14 | No. 15 | No. 16 | No. 17 | No. 18 |
|---|---|---|---|---|---|---|
| Glass Composition (% by mass) | | | | | | |
| $SiO_2$ | 67.8 | 66.7 | 67.9 | 67.55 | 67.75 | 65.1 |
| $Al_2O_3$ | 23.0 | 22.9 | 22.1 | 22.1 | 22.1 | 22.0 |
| $Li_2O$ | 2.5 | 3.8 | 3.5 | 3.4 | 3.5 | 4.4 |
| MgO | 1.0 | 0.1 | 0.3 | 0.5 | 0.4 | 1.0 |
| ZnO | 1.3 | 1.2 | 1.0 | 1.0 | 0.9 | — |
| $Na_2O$ | — | 0.3 | 0.1 | 0.1 | 0.1 | 0.4 |
| $K_2O$ | 0.7 | 0.5 | 0.6 | 0.6 | 0.6 | 0.3 |
| CaO | — | — | — | — | — | — |
| BaO | — | — | — | — | — | 1.2 |
| $TiO_2$ | 1.4 | 1.2 | 1.5 | 1.5 | 1.6 | 2.0 |
| $ZrO_2$ | 2.3 | 1.3 | 1.8 | 1.9 | 1.6 | 2.2 |
| $P_2O_5$ | — | 1.7 | 1.0 | 1.2 | 1.2 | 1.4 |
| $B_2O_3$ | — | — | — | — | — | — |
| $SnO_2$ | — | 0.3 | 0.2 | 0.15 | 0.25 | — |
| $TiO_2 + ZrO_2$ | 3.7 | 2.5 | 3.3 | 3.4 | 3.2 | 4.2 |
| $Li_2O + MgO + ZnO$ | 4.8 | 5.1 | 4.8 | 4.9 | 4.8 | 5.4 |
| Clarity | 3 | 5 | 5 | 5 | 5 | 3 |
| Degree of Devitrification due to Temperature Drop Schedule (1) | 4 | 5 | 5 | 5 | 5 | 1 |
| Main Crystal | β-Q | β-Q | β-Q | β-Q | β-Q | β-Q |
| Precipitation of Large-size Crystals | ○ | ○ | ○ | ○ | ○ | ○ |
| Cracks Schedule (2) | ○ | ○ | ○ | ○ | ○ | X |
| Main Crystal | β-S | β-S | β-S | β-S | β-S | β-S |
| Cracks | ○ | ○ | ○ | ○ | ○ | X |
| Amount of Thermal Deformation (mm) | 10 | 8 | 9 | 9 | 8 | — |

TABLE 4

| | No. 19 | No. 20 | No. 21 | No. 22 |
|---|---|---|---|---|
| Glass Composition (% by mass) | | | | |
| $SiO_2$ | 65.5 | 65.3 | 66.0 | 66.1 |
| $Al_2O_3$ | 22.2 | 22.5 | 22.4 | 22.9 |
| $Li_2O$ | 3.8 | 3.9 | 4.4 | 4.1 |
| MgO | 0.9 | 1.0 | 0.8 | 0.55 |
| ZnO | — | — | — | — |
| $Na_2O$ | 0.7 | 0.5 | 0.5 | 0.4 |
| $K_2O$ | — | 0.3 | 0.5 | 0.3 |
| CaO | 0.5 | — | 0.6 | — |
| BaO | 1.0 | 1.2 | 1.5 | — |
| $TiO_2$ | 2.3 | 1.6 | 1.1 | 2.1 |
| $ZrO_2$ | 1.9 | 2.1 | 1.0 | 2.05 |
| $P_2O_5$ | 1.0 | 0.9 | 1.2 | 1.35 |
| $B_2O_3$ | — | — | — | — |
| $SnO_2$ | — | 0.7 | — | 0.15 |
| $TiO_2 + ZrO_2$ | 4.2 | 3.7 | 2.1 | 4.15 |
| $Li_2O + MgO + ZnO$ | 4.7 | 4.9 | 5.2 | 4.65 |
| Clarity | 3 | 5 | 3 | 4 |
| Degree of Devitrification due to Temperature Drop Schedule (1) | 2 | 1 | 5 | 2 |
| Main Crystal | β-Q | β-Q | β-Q | β-Q |
| Precipitation of Large-size Crystals | ○ | ○ | X | ○ |
| Cracks Schedule (2) | X | X | X | X |
| Main Crystal | β-S | β-S | β-S | β-S |
| Cracks | X | X | X | X |
| Amount of Thermal Deformation (mm) | — | — | — | — |

The individual samples in the above tables were prepared in the following procedure.

First, raw materials were compounded to provide the individual glass compositions shown in percent by mass in the tables, and each glass composition was homogeneously mixed, then put into a platinum crucible and then melted therein at 1600° C. for 20 hours. Next, the molten glass was poured out onto a carbon plate, formed with a thickness of 5 mm using a roller, and then cooled from 700° C. to room temperature at a rate of temperature drop of 100° C./hr using an annealing furnace, thereby preparing crystallizable glass and obtaining each sample.

Each sample thus obtained was evaluated in terms of clarity and degree of devitrification due to temperature drop.

Furthermore, each sample was once increased in temperature up to 1500° C. to form glass melt, and the glass melt was held at the temperature for an hour, then cooled from 1500° C. to 700° C. at a rate of temperature drop of 50° C./min, and then crystallized according to two schedules described below. The crystallized glass thus obtained was evaluated in terms of type of main crystals, whether or not large-size crystals have been precipitated and whether or not cracks have been produced. Furthermore, the crystallized glass obtained by crystallization according to Schedule (2) was evaluated also in terms of amount of thermal deformation. The results are shown in TABLES 1 to 4. Note that in the tables "β-Q" indicates β-quartz solid solution and "β-S" indicates β-spodumene solid solution.

(1) Nucleation at 780° C. for two hours, and then crystal growth at 900° C. for an hour
(2) Nucleation at 780° C. for two hours, and then crystal growth at 1160° C. for an hour In this regard, the rate of temperature rise from room temperature to nucleation temperature was 300° C./hr, the rate of temperature rise from nucleation temperature to crystal growth temperature was 150° C./hr, and the rate of temperature drop from crystal growth temperature to room temperature was 100° C./hr.

As is evident from the tables, Samples Nos. 1 to 17, which are inventive examples, had less than five seeds per 100 g and therefore exhibited excellent clarity. Also in the evaluation of degree of devitrification due to temperature drop, the samples had a small number of devitrified products precipitated of less than 20 and therefore exhibited excellent property regarding the degree of devitrification due to temperature drop. The samples are expected to be less likely to be devitrified even when formed into shape while being slowly cooled as in a float process. Furthermore, when each of the samples was slowly cooled and then crystallized by subjecting it to heat treatment in Schedule (1), transparent crystallized glass could be obtained in which β-quartz solid solution was precipitated as main crystals, and neither opaque nor crack due to precipitation of large-size crystals were found in the glass. On the other hand, each sample subjected to heat treatment in Schedule (2) provided white opaque crystallized glass in which β-spodumene was precipitated as main crystals having no crack. In addition, each white opaque crystallized glass had a small amount of thermal deformation of 10 mm or less and therefore exhibited excellent creep resistance.

In contrast, in the evaluation of degree of devitrification due to temperature drop, Samples Nos. 18 to 20 and 22, which are comparative examples, had a large number of devitrified products precipitated of 20 or more and therefore exhibited poor property regarding the degree of devitrification due to temperature drop. Thus, the samples are expected to cause devitrification when formed into shape while being slowly cooled as in a float process. Furthermore, when each of the samples was slowly cooled and then crystallized by subjecting it to individual heat treatments in Schedules (1) and (2), crystallized glass could be obtained in which β-quartz solid solution or β-spodumene solid solution was precipitated as main crystals. However, the samples produced cracks when crystallized.

Sample No. 21 had no devitrified product precipitated therein and therefore exhibited excellent property regarding the degree of devitrification due to temperature drop. However, when the sample was slowly cooled and then crystallized by subjecting it to heat treatment in Schedule (1), large-size crystals were precipitated and clouding and cracks occurred. Furthermore, when the sample was crystallized by subjecting it to heat treatment in Schedule (2), crystallized glass could be obtained in which β-spodumene solid solution was precipitated as main crystals. However, the sample produced cracks when crystallized.

The evaluation of clarity was made by calculating the number of seeds per 100 g of each sample and classifying a sample having zero seeds per 100 g of sample as "5", a sample having zero to less than two seeds (exclusive of zero) as "4", a sample having two to less than five seeds as "3", a sample having five to less than ten seeds as "2", and a sample having ten or more seeds as "1". Note that the smaller number of seeds means that the glass has a smaller number of seeds remaining therein and has better clarity.

The evaluation of degree of devitrification due to temperature drop was made in the following manner. First, individual pieces of samples (30 g) each cut to a size of approximately 20 mm square were put into porcelain crucibles and allowed to stand in a temperature control furnace at 1500° C. for an hour. Then, the sample pieces were cooled from 1500° C. to 700° C. at a rate of temperature drop of 10° C./min and then cooled from 700° C. to room temperature at a rate of temperature drop of 100° C./hr. Subsequently, the glass samples were evaluated by visual observation by classifying a sample having no devitrified product therein as "5", a sample having zero to less than five devitrified products (exclusive of zero) as "4", a sample having five to less than twenty devitrified products as "3", a sample having twenty to less than fifty devitrified products as "2", and a sample having fifty or more devitrified products as "1". Note that the smaller number of devitrified products means that the glass has better property regarding the degree of devitrification due to temperature drop and is less likely to be devitrified even when formed into shape while being slowly cooled as in a float process.

The evaluation of type of main crystals of crystallized glass was made by measuring 2θ=10 to 60° using an X-ray diffractometer (RINT-2100 manufactured by Rigaku Corporation).

The evaluation of whether or not large-size crystals have been precipitated was made by visually observing resultant transparent crystallized glass samples in which β-quartz solid solution was precipitated by heat treatment in Schedule (1). The samples containing no precipitated large-size crystal and not found to be opaque were indicated by "○", while the samples containing precipitated large-size crystals and found to be cloudy were indicated by "x".

The evaluation of whether or not cracks have been produced was made by observing resultant crystallized glass samples obtained by respective heat treatments in Schedules (1) and (2). The samples found to have no crack were indicated by "○", while the samples found to have cracks were indicated by "x".

The evaluation of amount of thermal deformation was made in the following manner. First, each sample was subjected to heat treatment in Schedule (2) to prepare crystallized glass in which β-spodumene solid solution was precipitated as main crystals, and the crystallized glass was cut and polished to obtain a sheet of crystallized glass with a size of 250 mm×25 mm and a thickness of 3 mm. Next, as shown in FIG. 1(a), the obtained crystallized glass sheet 1 was clamped for a length of 50 mm from one end between ceramic pieces 2. Next, the crystallized glass sheet 1 was put in a horizontal stationary position into an electric furnace, and subjected to heat treatment at 1000° C. for an hour. After the heat treatment, as shown in FIG. 1(b), the glass sheet 1 was measured in terms of amount of deformation A of the other end not clamped by the ceramic pieces 2. Note that the smaller amount of deformation A means that the crystallized glass has better creep resistance and is less likely to be deformed even when used at high temperatures for a long time.

REFERENCE SIGNS LIST

1 . . . crystallized glass sheet
2 . . . ceramic piece
A . . . amount of deformation

The invention claimed is:

1. Crystallized glass obtained by subjecting crystallizable glass to heat treatment to crystallize the crystallizable glass; wherein
the crystallizable glass substantially contains neither $As_2O_3$ nor $Sb_2O_3$ and has a composition of, in percent by mass, 55.0 to 73.0% $SiO_2$, 17.0 to 27.0% $Al_2O_3$, 2.0 to 5.0% $Li_2O$, 0 to 1.5% MgO, 0 to 1.5% ZnO, 0 to 1.0% $Na_2O$, 0 to 1.0% $K_2O$, 0 to 3.8% $TiO_2$, 0 to 2.5% $ZrO_2$, 0.1 to 0.6% $SnO_2$, and 2.3 to 3.8% $TiO_2+ZrO_2$.

2. The crystallized glass according to claim 1, wherein main crystals are made of β-quartz solid solution or β-spodumene solid solution.

3. The crystallized glass according to claim 1, wherein a combined content of 2.0 to 5.2% by mass of $Li_2O$, MgO and ZnO is contained in the crystallizable glass.

4. The crystallized glass according to claim 1, wherein 0.05 to 1.0% by mass of $Na_2O$ and 0.05 to 1.0% by mass of $K_2O$ are contained in the crystallizable glass.

5. The crystallized glass according to claim 1, wherein a combined content of 0.35 to 1.0% by mass of $Na_2O$ and $K_2O$ is contained in the crystallizable glass.

* * * * *